US010932145B1

(12) United States Patent
Ho et al.

(10) Patent No.: US 10,932,145 B1
(45) Date of Patent: Feb. 23, 2021

(54) SYSTEMS AND METHODS FOR IN-SERVICE TRAFFIC AND/OR RESOURCE MIGRATION BETWEEN PROCESSING UNITS IN A COMMUNICATIONS NETWORK

(71) Applicant: TELEFONAKTIEBOLAGET LM ERICSSON (PUBL), Stockholm (SE)

(72) Inventors: Pui-Sze Ho, Euless, TX (US); Lesley Mcghee, Frisco, TX (US); Mark Blake, Coppell, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/600,715

(22) Filed: Oct. 14, 2019

(51) Int. Cl.
*H04W 24/04* (2009.01)
(52) U.S. Cl.
CPC ................... *H04W 24/04* (2013.01)
(58) Field of Classification Search
CPC ...................................................... H04W 24/04
See application file for complete search history.

(56) References Cited

U.S. PATENT DOCUMENTS

| 2007/0297424 | A1* | 12/2007 | Xia | H04L 65/1069 370/400 |
|---|---|---|---|---|
| 2008/0316998 | A1* | 12/2008 | Procopio | H04L 67/14 370/352 |
| 2009/0003363 | A1* | 1/2009 | Benco | H04L 65/103 370/401 |
| 2011/0149742 | A1* | 6/2011 | Joensuu | H04W 92/14 370/241 |
| 2014/0003337 | A1* | 1/2014 | Majmundar | H04W 48/06 370/328 |

(Continued)

OTHER PUBLICATIONS

3rd Generation Partnership Project; Technical Specification Group Services and System Aspects; Intra-domain connection of Radio Access Network (RAN) nodes to multiple Core Network (CN) nodes (Release 15). 3GPP TS 23.236 V15.0.0 (Jun. 2018).

(Continued)

*Primary Examiner* — Joseph E Dean, Jr.

(57) ABSTRACT

Systems, methods, and apparatus are disclosed that provide in-service traffic and/or resource migration between processing units in a communications network. An example method includes one or more processing units communicating with at least one processing unit of a plurality of processing units, where the communicating corresponds to a plurality of resources and resource requirements of the plurality of processing units. The one or more processing units evaluate resource utilization and projected traffic of a subset of the plurality of processing units. The one or more processing units determine, based on the resource requirements, to migrate one or more selected interdependent resources for a service from one or more processing units to one or more receiving processing units of the plurality of processing units. The one or more processing units instruct the one or more selected interdependent resources to perform payload processing corresponding to one or more receiving processing units of the plurality of processing units, where the payload processing causes the one or more migrated resources to provide the service to the one or more receiving processing units.

17 Claims, 10 Drawing Sheets

(56) References Cited

U.S. PATENT DOCUMENTS

| | | | | |
|---|---|---|---|---|
| 2015/0063124 A1* | 3/2015 | Overton | ............... | H04L 65/104 370/241 |
| 2015/0327152 A1* | 11/2015 | Tsutsui | .............. | H04W 28/0284 455/404.1 |
| 2017/0214790 A1* | 7/2017 | Sun et al. | ............... | H04M 3/22 |

OTHER PUBLICATIONS

Series H; Audiovisual and Multimedia Systems—Infrastructure of audiovisual services—Communication procedures. Gateway Control Protocol: Mar. 2013, Version 3, 242 pages.

\* cited by examiner

SYSTEMS AND METHODS FOR IN-SERVICE TRAFFIC AND/OR RESOURCE MIGRATION BETWEEN PROCESSING UNITS IN A COMMUNICATIONS NETWORK

TECHNICAL FIELD

The present disclosure relates generally to communications systems and, more particularly, to in-service migration of traffic and/or resources between processing units in a communications network.

BACKGROUND

Conventional migration technologies relating to wireless communications systems include Iu-Flex, Public Switched Telephone Network (PSTN) gateways, flash cutover migration, and Radio Network Controller (RNC) rehoming. Iu-Flex is an application-based solution to continue to serve new subscriber calls, where the RNC selects other in-service Mobile Switching Centers (MSCs) in a pool of MSCs during an MSC outage. A PSTN Gateway is another application-based solution to continue to serve new PSTN traffic by routing traffic to another Media Gateway Control Function (MGCF) or MSC during an MGCF/MSC outage. A flash cutover migration is utilized to move traffic from one MSC to another MSC or from a physical platform to a virtual platform within a short-span of time and without a phase-in period. RNC rehoming is used to move an RNC from interworking with one MSC host to another MSC.

SUMMARY

The examples described in the present disclosure provide techniques for traffic and/or resource migration in a communications network. These techniques provide advantages including increased automation, greater transparency, seamless fast migration of live traffic during planned outages, ability to automatically rollback responsive to issues during planned migration, application level software changes without dependency on underlying hardware or cloud/platform infrastructure, and more fully utilizing resources during planned migration and sunny days. Other advantages may be readily apparent to one having skill in the art. Certain examples may have none, some, or all of the recited advantages.

As described herein, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method performed by a plurality of processing units to migrate live traffic and/or resources in a communications network. The method includes one or more processing units communicating with one or more processing units, with the communicating corresponding to a plurality of resources, resource requirements of the plurality of processing units, and forwarding of events to the processing unit that performs payload processing with the associated resources. The one or more processing units evaluate resource utilization and projected traffic of a subset of the group of processing units. The one or more processing units determine to migrate selected resources such as user plane resources, control plane resources, and/or location-dependent resources that operate interdependently to provide a service from one or more processing units to one or more receiving processing units of the plurality of processing units. The one or more processing units instruct the selected resources to perform payload processing corresponding to one or more receiving processing units of the plurality of processing units, where the payload processing causes the selected resources to provide the service to the one or more receiving processing units.

Another general aspect includes a system having a non-transitory memory and one or more hardware processors coupled to the non-transitory memory and configured to read instructions from the non-transitory memory to cause the system to perform operations corresponding to the above method. Yet another general aspect includes a non-transitory computer-readable storage medium having stored thereon instructions executable by processing circuitry to perform operations corresponding to the above method.

BRIEF DESCRIPTION OF THE DRAWINGS

For a more complete understanding of the disclosed embodiments and their features and advantages, reference is now made to the following description, taken in conjunction with the accompanying drawings.

DETAILED DESCRIPTION

Figure 1:
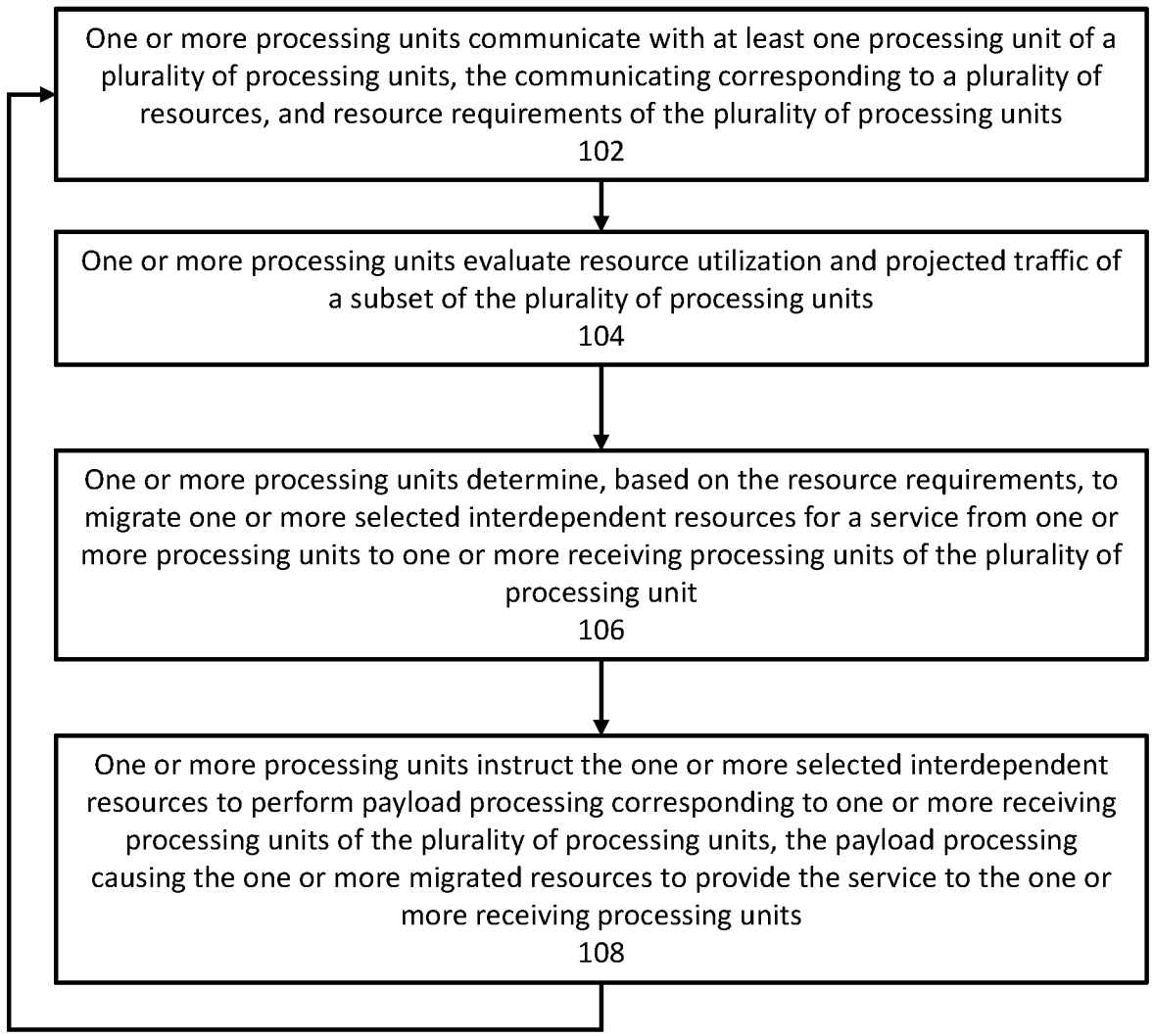
FIG. 1 is a flowchart illustrating a method performed by a collaboration of participating processing units to migrate in-service traffic and/or resources to one or more receiving processing units in a communications network, according to some examples of the present disclosure.

Inventive concepts will now be described more fully hereinafter with reference to the accompanying drawings, in which examples of inventive concepts are shown. Inventive concepts may, however, be embodied in many different forms and should not be construed as limited to the examples set forth herein. Rather, these examples are provided so that this disclosure will be thorough and complete, and will fully convey the scope of present inventive concepts to those skilled in the art. It should also be noted that these examples are not mutually exclusive. Components from one example may be tacitly assumed to be present/used in another example.

Conventional migration technology, such as the examples provided in the Background section, suffer from a number of problems.

For example, with respect to Iu-Flex, if Iu-Flex software changes are not already implemented in the RNC, new capability/software may not be feasible due to various reasons, such as the RNC sunsetting, being in sustaining operation mode, or when limited investment is available on such node. Software changes are also required on its pool of MSCs. Further, if Iu-Flex software is already supported in the RNC, it requires a full mesh of provisioning and active connectivity to the associated pool of MSCs. Also, software support may be limited since the RNC is about to sunset. Iu-Flex must be supported both on the RNC and all associated MSCs.

For a PSTN gateway, insertion of a PSTN Gateway requires the existing PSTN nodes to change their MSC/MGCF destination point code to be the new PSTN Gateway point code. The interworking PSTN nodes may be owned by a different operator(s) and such a change of point code provisioning requires co-ordination, and partial or full trunk traffic outage may occur.

For flash cutover, the conventional approach results in an outage if the point code is being reused by the new MSC. Otherwise PSTN-initiated calls must be routed to a different MSC if an alternative trunk is available during this period of cutover time and until the resources are back in service.

Finally, for RNC rehoming, an RNC cannot service subscribers during the period of rehoming and causes more traffic to be routed through the neighboring RNCs if possible.

In summary, none of these conventional solutions offers a method of migrating live traffic and/or resources from one processing unit (e.g., a current owner processing unit) to another processing unit (e.g., a receiving processing unit) without manual intervention on other processing units or resources during migration or without partial/complete resource outage.

The present disclosure addresses problems like those described above, using a new mechanism of migrating live traffic and/or resources from a current owner processing unit to one or more receiving processing units within a plurality of processing units, without manual intervention on other processing units or resources during migration and without the dependency on underlying hardware or cloud/platform infrastructure. These techniques also provide partial migration from one processing unit to one or more receiving processing units, such as where there is congestion or to perform load-balancing.

In some examples, the techniques described herein further may be used to provide in-service migration of live traffic, resources such as Media Gateways (MGWs) and PSTN trunks, and 3G/SGs subscribers from a current owner processing unit MSC/MGCF to one or more receiving MSC/MGCF processing units within a plurality of MSC/MGCFs without manual intervention on neighboring nodes, such as I-CSCFs and/or far end nodes/networks such as PSTN networks, during the execution of the migration procedure.

A migration may be a full migration or a partial migration. A full migration may include a planned migration of live traffic, resources, and/or subscribers between processing units. After the migration, a processing unit may be removed from service to perform a software or hardware upgrade, or to perform a repair. A partial migration may be performed to mitigate congestion or for automatic load-balancing among processing units.

FIG. 1 is a flowchart illustrating a method performed by a collaboration of participating processing units to migrate in-service traffic and/or resources, according to some examples of the present disclosure. In the present example, this technique may be used to provide methodical in-service migration of live traffic and/or resources from a current owner processing unit to one or more receiving processing units. The migration may be a full or a partial migration (e.g., for automatic load balancing or to handle congestion within a plurality of processing units). As discussed above, the processing units may be structured as MGCFs. An example of a communications network with an in-service traffic and/or resource migration system is described in more detail with respect to FIG. 2, according to some examples of the present disclosure.

In some examples, the migration is a planned migration of traffic for an out of service software upgrade of a MGCF processing unit that is a current owner of resources. For example, the MGCF is taken out of service, so the live traffic/resources/subscribers are migrated seamlessly to one or more receiving MGCF processing units before the current owner MGCF is taken down. These MGCFs may be grouped together in a plurality of MGCFs, based on the MGCFs sharing a common characteristic.

At step 102, one or more processing units that own some set of resources communicate with at least one processing unit of a plurality of processing units. The communicating corresponds to a plurality of resources and resource requirements of the plurality of processing units. In some examples, the communicating includes forwarding events to a processing unit that performs payload processing with the associated owned or migrated resource(s). An example sequence of communications is described in more detail with respect to FIG. 3.

In some examples, the communicating includes one or more of: health check information, migration permission information, migration status information, forwarded service events comprising one or more Integrated Services Digital Network User Part (ISUP) messages, or security information.

At step 104, one or more processing units evaluate the resource utilization and the projected traffic of a subset of the plurality of processing units. At step 106, one or more processing units determine to migrate selected interdependent resources from one or more processing units to one or more receiving processing units of the plurality of processing units. When determining the selected resources for migration, resources that operate interdependently to provide a service should be considered. The resources selected for migration ensure minimum or no service degradation on the participating processing units. In the example of an MGCF, if a receiving MGCF will use a predicted amount of MGWs to provide service to potential incoming subscribers based on its traffic projection, a predicted amount of MGWs with selected media capabilities are migrated to that receiving MGCF.

In some examples, the determining to perform the migration is provided responsive to an evaluation of processing conditions and capabilities corresponding to the plurality of affected processing units. The evaluation may include receiving health check responses and migration permission indications from the one or more receiving processing units. The evaluation may include the processing unit, as a current owner of a resource, coordinating with one or more receiving processing units to prepare for a traffic migration, and the coordination between the current owner processing unit and the one or more receiving processing units continues throughout the traffic migration. In some examples, the processing unit may identify, based on the evaluation, that a neighboring processing unit has received an unexpected burst of traffic. Responsive to the identifying, the processing unit can then ready resources for a higher inflow of traffic.

In some examples, the determining includes analyzing neighboring processing units and categorizing them accordingly, based on their run-time and/or pre-provisioned properties, so that the participating processing units can relocate the live traffic and/or resources from a current owner processing unit to a receiving processing unit transparently during migration. For example, when analyzing a neighboring processing unit that does not have an established protocol for relocation, a relay function or processing unit can be provided by a participating processing unit to avoid changes to the neighboring processing unit and to relocate the communication to it without impact. For an MGCF, a Signaling Relay (SR) is an example of a control plane relay (as described in FIG. 2) used to facilitate transparent seamless migration of RNCs and/or MMEs to a new MGCF.

In some examples, the determining to perform a migration is provided responsive to a manual migration command. For example, a MGCF receiving a manual migration command from a craftsperson sends a migration permission request and/or information request to the one or more participating MGCFs.

At step 108, one or more processing units migrate the selected interdependent resource(s) to the one or more receiving processing units of the plurality of processing units. The processing unit instructs the selected resources to perform payload processing corresponding to one or more receiving processing units of the plurality of processing units, the payload processing causing the selected resources to provide the service to the one or more receiving processing units. An example of migrating traffic and/or resources is described in further detail with respect to FIGS. 4, 5, and 6.

The selected resources may be separated into groups that are migrated at different times, where each group may include a subset of resources from various resource types served by the current owner processing unit. Moreover, a threshold number of resources in each group may be selected based on criteria including historical, run-time, and/or projected traffic patterns as well as the migration rate of the associated interdependent resources, such that the processing unit(s) can predict that at least a minimum threshold of service is provided during and after the migration. During a migration, the migration of any resource type may be temporarily stopped or restarted to ensure that the migration of the interdependent resources remains proportional throughout the migration.

In some examples where a relay forwards messages between a selected resource and the participating processing units, the migration of the selected resources includes migrating the relay to the one or more receiving processing units. In other examples, the processing unit can trigger a neighboring processing unit or a resource to select an alternate route, without migrating a relay, that causes traffic to reach the one or more receiving processing units.

The migration of the selected resources may be different depending on the service that is provided. For example, when the service is an ISUP call processing service, the selected resources that operate interdependently may include ISUP CIC resources with PSTN signaling connectivity and MGWs providing H.248 physical terminations, where each of the ISUP CICs is assigned a bearer connection.

In another example, where the service is a Short Message Service (SMS), the selected resources that operate interdependently may include a control plane resource (for example, signaling resources for transporting SMS messages) that associates with a location-dependent resource (for example, assigned serving processing unit corresponding to registered mobile devices that communicate the SMS messages).

In another example, where the service is a 3G call service, the selected resources that operate interdependently include a user plane resource (for example, a MGW providing services such as a G.711, narrowband Adaptive Multi-Rate (AMR), or wideband AMR codec) that associates with a location-dependent resource (for example, assigned serving processing unit with the subscriber data corresponding to a registered mobile device), and the signaling connectivity with an RNC to which the registered mobile device is tuned.

In another example, where the service is a Voice over Long-Term Evolution (VoLTE) interworking with Public Switched Telephone Network (PSTN) call service using an MGCF, the selected resources that operate interdependently may include a MGW providing an H.248 ephemeral termination for a bearer corresponding to a Session Initiation Protocol (SIP) session, an Internet Protocol Multimedia Subsystem (IMS) far end connected over a SIP signaling connection, a MGW providing a H.248 physical termination for an ISUP bearer, and the associated ISUP CIC with PSTN signaling connectivity.

Before migrating user plane resources, the processing unit may first deload services from user plane resources of the selected resources. This deloading may include selecting other user plane resources that are not deloading to handle incoming service requests for those services. Once the existing requests on the services are completed, and the processing unit determining that the services are not currently handling any requests, the processing unit may then instruct the user plane resources to re-assign one or more communication links to the one or more receiving processing units for payload processing. An example of deloading and migrating user plane resources is described in further detail with respect to FIGS. 4, 5, and 6.

In the example of a MGCF, the MGCF migrates selected interdependent MGWs, SRs, and 3G/SGs subscribers to one or more receiving MGCFs. During the migration, the migration of any resource type may be temporarily stopped or restarted to ensure that the migration of the interdependent resources remains proportional throughout the migration. For example, the subscriber migration may be temporarily stopped in order to allow the migration of MGWs to align properly. Once the MGW migration catches up, the subscriber migration may be restarted.

The processing unit may also forward incoming events corresponding to selected resources to the processing unit that performs payload processing with the associated resource(s). The forwarding of the incoming events may occur before, during, and/or after the migration of the owned and/or migrated resources. Event forwarding in some examples is a fundamental integrated function for facilitating in-service traffic and/or resource migration. Event forwarding is described in more detail with respect to FIGS. 7, 8, 9, and 10.

If an error is encountered during the traffic migration, an autonomous or manual rollback may be performed in order to migrate traffic and/or resources back to the previous owner processing unit. Traffic and/or resources may also be migrated back autonomously or manually to a previous owner processing unit when health checks pass and it is ready (e.g., a new software version is detected after its software upgrade) to restart processing traffic. This return migration from the previous receiving processing unit(s) to a previous owner processing unit may be performed using similar steps to those described above. Rollback and return migrations are migrations according to some examples of the present disclosure.

Figure 2:
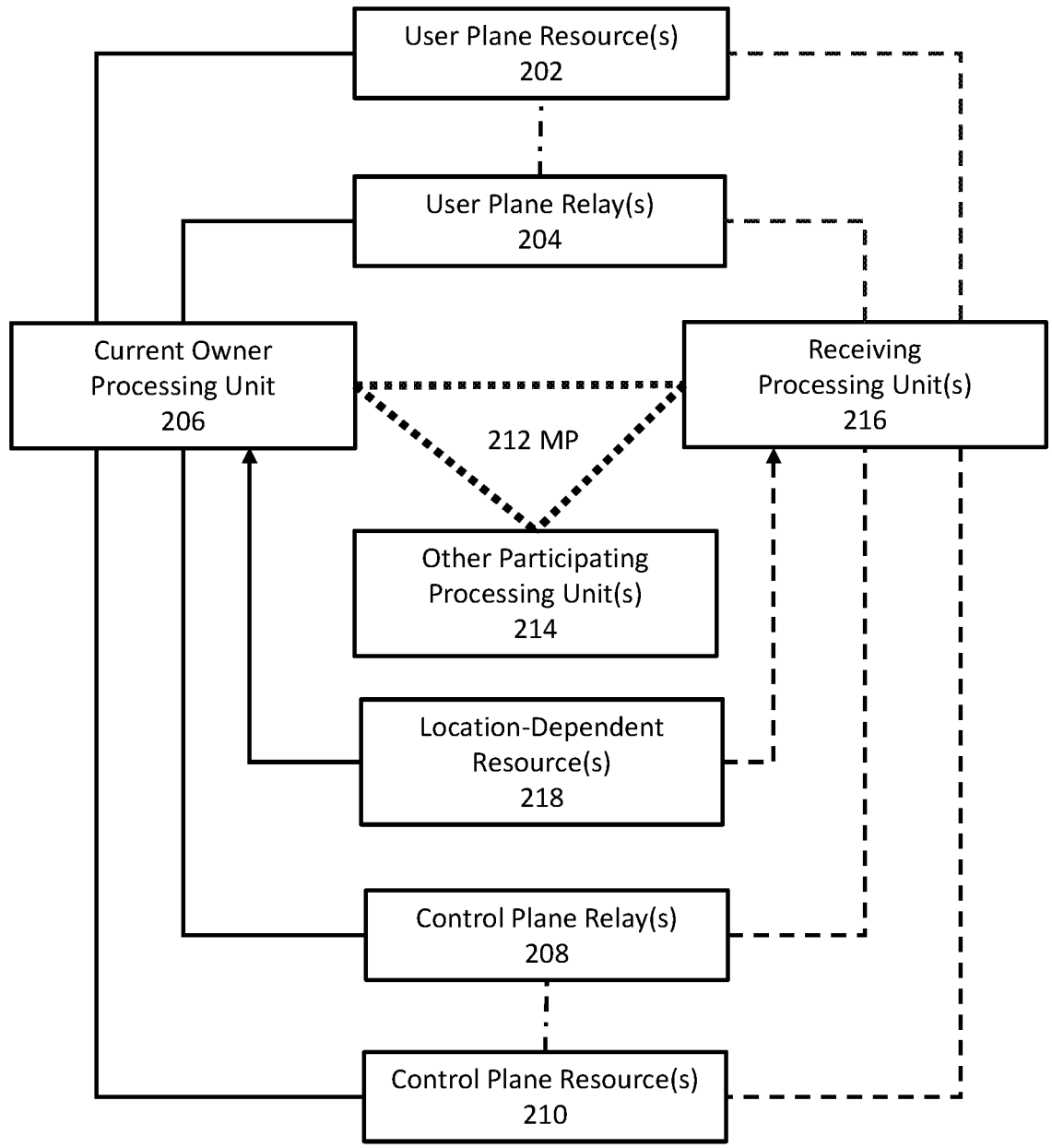
FIG. 2 is a block diagram illustrating the in-service traffic and/or resource migration system consisting of a plurality of processing units and their relationship with the traffic and/or resources that are being migrated from the current owner processing unit to one or more receiving processing units, according to some examples of the present disclosure.

FIG. 2 is a block diagram illustrating a communications network with an in-service traffic and/or resource migration system consisting of a plurality of processing units and their relationship with the resources in which user plane resources, control plane resources, and/or location-dependent resources may be migrated from the current owner processing unit to one or more receiving processing units, according to some examples of the present disclosure.

Each solid line represents a resource that is being migrated from a current owner processing unit, and each dashed line represents the corresponding resource that is being migrated to a new owner (the receiving processing unit). Each dash-dotted line represents a relationship between a resource and its relay through which it communicates with the processing unit(s) when required. The solid arrow line represents the location-dependent resource residing within the current owner processing unit, and the dashed arrow line represents where the location-dependent resource will reside as it is migrated.

Figure 3:
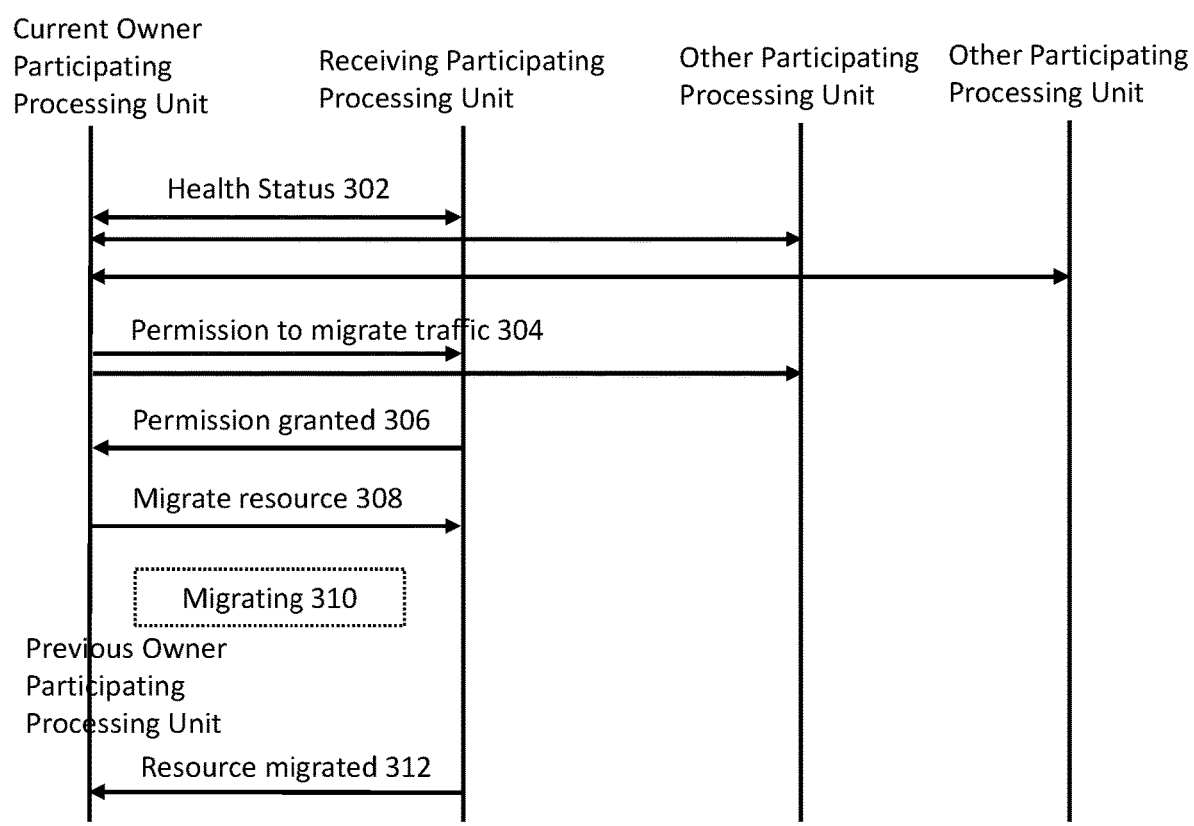
FIG. 3 is a sequence diagram illustrating an example of migration protocol communications between a current owner processing unit and other participating processing units, according to some examples of the present disclosure.

In some examples, a current owner processing unit 206 is communicatively coupled to one or more other receiving processing units 216 and optionally one or more other participating processing units 214 in a plurality of processing units via a migration protocol (MP) 212, an example of which is described in more detail with respect to FIG. 3. In some examples, the processing units (e.g., 206, 216, and 214) are structured as MGCFs. In some examples, the processing units are grouped in a plurality of processing units, where each group of processing units shares one or more common characteristics. In the present example, the plurality of processing units 206, 216, and 214 implement the method that is described in more detail with respect to FIG. 1.

The processing units access user plane resources 202 and control plane resources 210. In some examples, these user plane resources 202 and control plane resources 210 are themselves structured as processing units. In the present example, the current owner processing unit 206 may migrate user plane resources 202, control plane resources 210, and/or location-dependent resources 218 to receiving processing unit(s).

In some examples, the processing units 206 and 216 are directly coupled to one or more of the user plane resources 202. In other examples, a user plane relay 204 couples the processing units to user plane resources 202. Similarly, the processing units may be directly coupled to control plane resources 210 or coupled via control plane relay(s) 208. A user plane relay 204 or a control plane relay 208 may be external to the processing units or included in an isolatable part of the processing units.

In the present example, the user plane resources 202 provide bearer and/or media resources, such as MGWs providing services for calls of 3G/SGs subscribers that use registered mobile devices to access services provided by a current owner processing unit 206.

In the present example, the control plane resources 210 are coupled with the plurality of processing units using signaling connections. Examples of control plane resources include an RNC to serve 3G subscribers, a Mobility Management Entity (MME) to serve SGs subscribers and also to allow handover from LTE to 3G access, Internet Protocol Multimedia Subsystem (IMS) nodes connected to the MGCF using the Session Initiation Protocol (SIP), PSTN nodes connected to the MGCF using ISUP and MF, and neighboring MSCs and/or MGCFs that are connected to the MGCF using ISUP and/or SIP-I. The current owner processing unit 206 may be directly coupled to control plane resources 210 or may be coupled via control plane relay(s) 208.

A location-dependent resource 218 is a resource that exists in one single serving processing unit providing service at any given time. Any services offered to a location-dependent resource should be offered by the serving processing unit for optimal performance and proper interaction of related services. Therefore, any user plane resources to complete a service for a location-dependent resource are preferred to be located in the same serving processing unit. For example, in a MGCF, the location-dependent resources include the 3G/SGs subscriber data, and a single MGCF offers services such as call hold, call retrieve, or call waiting to the 3G/SGs subscriber since these services have interactions.

In some examples, user plane relay(s) 204 and/or control plane relay(s) 208 can be included as an isolatable part of the MGCF or external to the MGCF, to communicate with the user plane resources 202 and/or control plane resources 210 correspondingly.

In more detail regarding the user plane relay(s) 204 and control plane relay(s) 208, the current owner processing unit 206 may be directly coupled to the user plane resources 202 and the control plane resources 210 if the protocol used by the current owner processing unit 206 and any receiving processing unit(s) 216 of the plurality of processing units have a relocation mechanism for communication. If the protocol used by the current owner processing unit 206 and any receiving processing unit(s) 216 of the plurality of processing units to communicate do not include a relocation mechanism, user plane relay(s) 204 and control plane relay(s) 208 may be used. User plane relay(s) 204 and control plane relay(s) 208 can be an isolatable part of the current owner processing unit 206 or external to it. Throughout this document, when the migration of a user plane and/or control plane resource is mentioned, it includes the user plane and/or control plane relay if one is present.

The determination for whether to include a relay may be based on whether the protocol used to communicate between the processing units has a relocation mechanism. For example, the protocol for communicating between RNC/MME and MSC processing units generally do not have a relocation mechanism, and so for these processing units the control plane relay 208 may be advantageously implemented. On the other hand, the protocol for communicating between MGWs and MSC processing units has a relocation mechanism, and so these units may be directly coupled without using relays.

FIG. 3 is a sequence diagram illustrating an example of migration protocol communications between a current owner processing unit and other participating processing units, according to some examples of the present disclosure.

As described below, the migration protocol includes communications that coordinate traffic migration from a current owner processing unit to one or more receiving processing units. In the present example, this migration protocol is implemented to perform the communications between the processing units that are described with respect to FIG. 1.

In the present example, the determination to perform a migration is responsive to multiple criteria including a health status message 302 that is sent to one or more processing units, which respond with their current status. Based on the criteria being met, the current owner processing unit determines to migrate its resources to one or more of the processing units, which will receive the resources.

Accordingly, the current owner processing unit sends a permission to migrate traffic message 304 to these participating processing units. In some examples, the permission to migrate traffic message 304 allows processing units, such as MGCFs to prepare for traffic migration of 3G/SGs subscribers and ISUP/SIP/SIP-I/MF trunk groups. One or more of the participating processing units respond with permission granted messages 306 (if the participating processing units are able to receive the resources). The current owner processing unit then sends a receiving processing unit a migrate resource message 308 that informs the receiving processing unit to prepare to receive the resources. The current owner processing unit, receiving processing unit, and resource work together to perform the migration 310, and after the migrating 310 is complete, the receiving processing unit sends a resource migrated message 312 to the current owner processing unit (which is now no longer the owner of the migrated resource). An example migration is described in more detail with respect to FIGS. 4, 5, and 6. Coordination between a current owner processing unit and a receiving processing unit may continue until the migration is completed. For each resource or set of resources to be migrated, 308, 310, and 312 are repeated.

Figure 4:
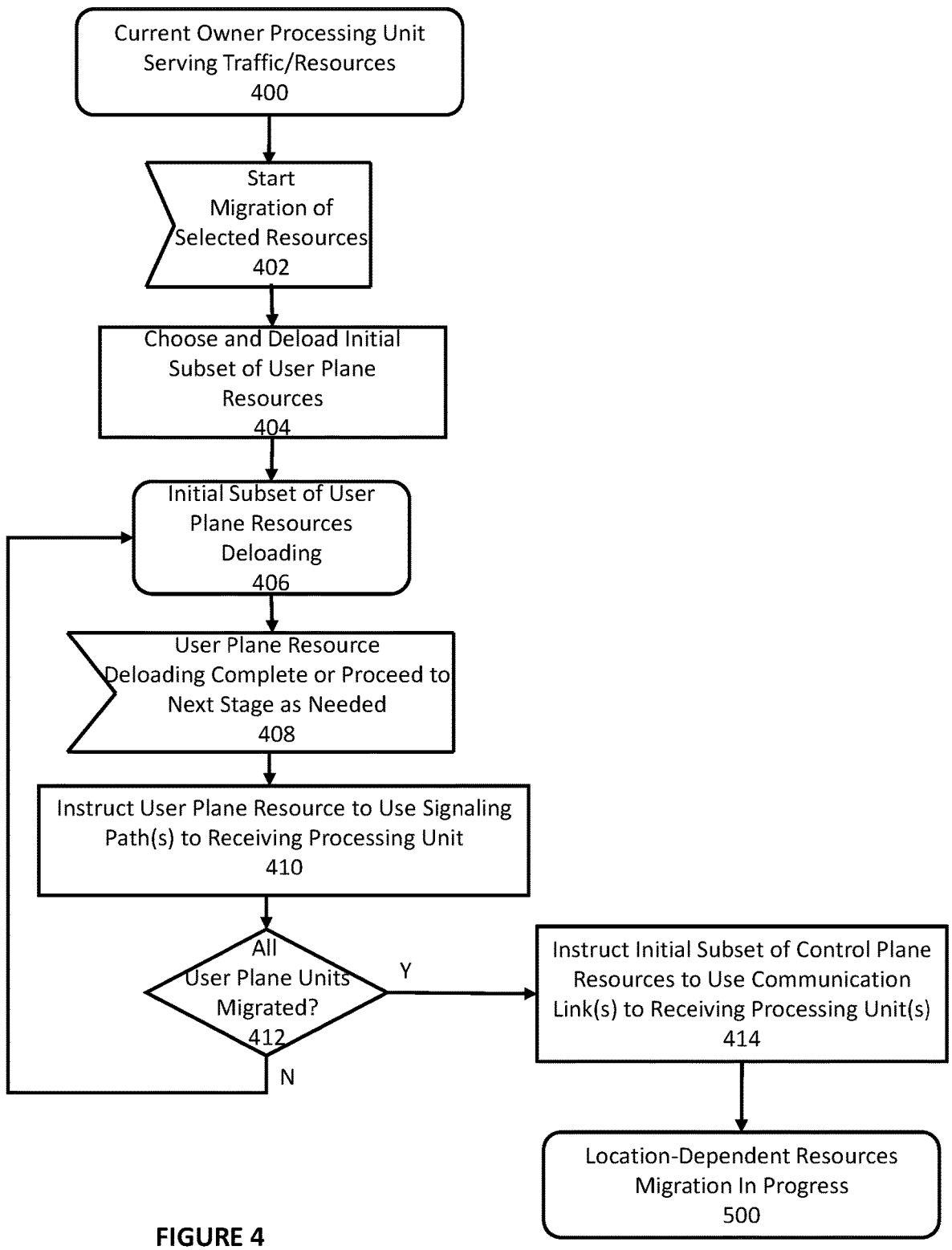
FIGS. 4, 5, and 6 are flowcharts illustrating more detailed example logic within step 108 of FIG. 1 from the perspective of the current owner processing unit coordinating a migration of interdependent resources with one or more receiving processing units, according to some examples of the present disclosure. The flowcharts are shown as one of the many examples on how to apply techniques from present disclosure in a communications network. The flows may vary depending on the types of resources and relationships among the resources used in a network.
Figure 5:
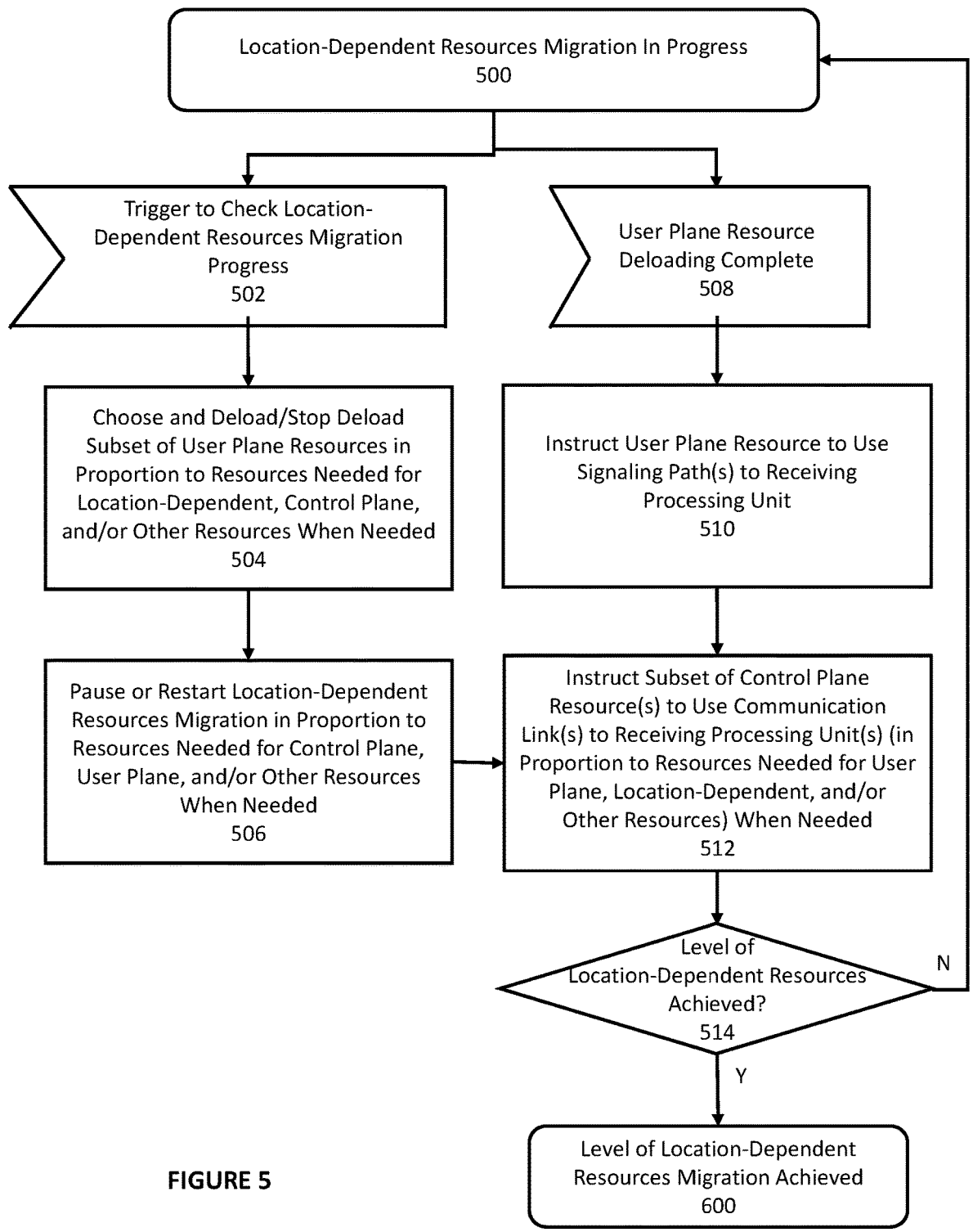
Figure 6:
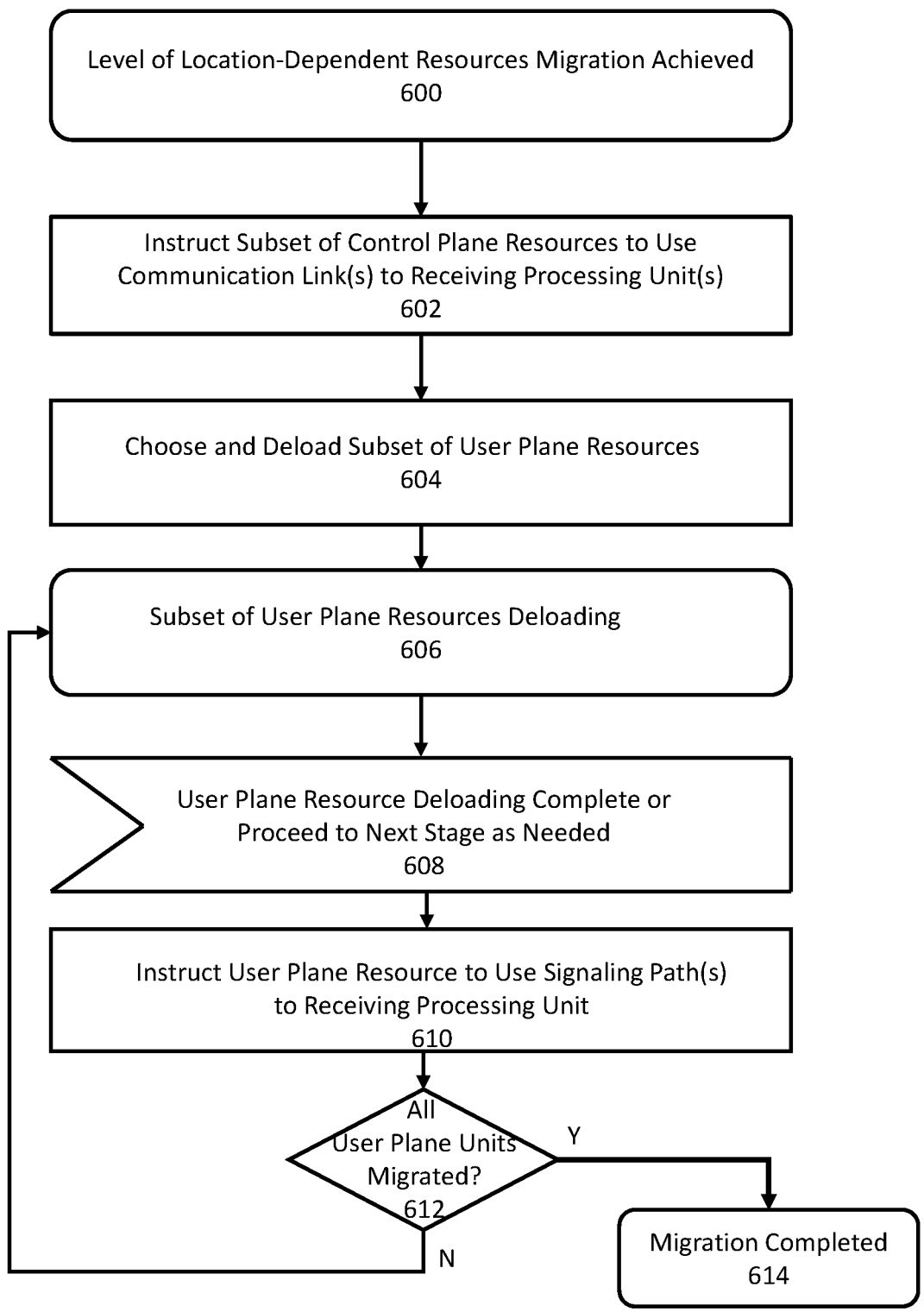

FIGS. 4, 5, and 6 are flowcharts illustrating more detailed example logic within step 108 in FIG. 1 from the perspective of the current owner processing unit coordinating a migration of interdependent resources with one or more receiving processing units, according to some examples of the present disclosure. The flowcharts are shown as one of the many examples on how to apply techniques from present disclosure in a communications network. The flows may vary depending on the types of resources and relationships among the resources used in a network.

In the present example, the deloading and migrating of user plane resources is performed after a current owner processing unit determines to migrate resources (e.g., step 108 that is described with respect to FIG. 1). In some examples, the processing units are MGCFs and the user plane resources include MGWs and/or relay functions (e.g., user plane relay(s) 204 that are described in more detail with respect to FIG. 2).

As discussed in more detail with respect to FIG. 3, a current owner processing unit and one or more receiving processing units coordinate via communications sent and/or received using a migration protocol. Throughout the traffic/resource migration, the new migration protocol (MP) is used to coordinate between the current owner processing unit and receiving processing unit(s) for reasons such as security, health check, permission, and error detection. The steps described with respect to FIGS. 4, 5, and 6 may be performed during the migrating (including steps 308, 310, and 312 that are described with respect to FIG. 3).

At step 400, a current owner processing unit is serving traffic and/or resources and is communicating with other participating processing units. The plurality of processing units may communicate with each other using a migration protocol (MP) as shown in step 302 of FIG. 3. Before step 402, a current owner processing unit determines to perform a migration, receives permission from one or more receiving processing units, and determines the selected resources for migration. At step 402, the migration begins.

For example, the MGCFs in a plurality of processing units may communicate with each other to determine when to perform a traffic/resource migration from a current owner MGCF to one or more receiving MGCFs of the plurality of processing units. In other examples, a migration indication may be provided by a user input, and the user input may indicate the group of resources selected for migration. In the example of a MGCF, the selected resources may include MGWs and/or Signaling Relays connected to RNCs and/or MMEs. The current owner MGCF coordinates with the one or more participating MGCFs using a migration protocol (MP), such as the MP described in more detail with respect to FIG. 3, to prepare for the traffic migration of 3G/SGs subscribers and ISUP/SIP/SIP-I/MF trunks, and the coordination between the current owner MGCF and participating MGCFs may continue throughout the traffic migration.

At step 404, the current owner processing unit coordinates with one or more receiving processing units of the plurality of processing units to select and deload an initial subset of the user plane resources to be migrated. In some examples, the initial subset may not contain any user plane resources if the receiving processing unit(s) has sufficient user plane resources to serve the initial traffic that is being migrated, and the flow continues at step 414. In the example of a MGCF, the current owner MGCF may coordinate with one or more receiving MGCFs to select an initial subset of the MGWs to be migrated.

At step 406, the selected user plane resources are deloaded to prepare the selected user plane resources for migration to the one or more receiving processing units, which await the resources. In some examples, a current owner MGCF selects an initial subset of MGWs (including, for example, a subset of resources from each bearer resource type on receiving MGCF(s)) served by the current owner MGCF for migration to the receiving MGCF(s). A threshold number of user plane resources (for example, MGWs) in the initial subset is calculated and migrated based on criteria including historical, run-time, and/or projected traffic patterns. The initial subset of MGWs is migrated to prepare the receiving MGCF(s) to serve additional traffic that is about to be migrated. The current owner MGCF deloads these MGWs by not selecting them for any new calls.

After the current owner processing unit determines, at step 408, that the deloading of a user plane resource is complete, the current owner processing unit instructs the deloaded user plane resource at step 410 to use a signaling path to a receiving processing unit for payload processing. This sequence (steps 406-412) may be repeated until, at step 412, all user plane resources in this subset are determined to have been migrated. Note that run-time traffic may fluctuate causing dynamic adjustment on the number and types of resources to be migrated. Steps 102, 104, and 106 may continue to provide input to the migration that is in progress.

In some examples of a MGCF, once all existing calls are complete on a MGW in the initial subset of MGWs, the current owner MGCF may use a H.248 Handoff procedure to instruct this MGW (which in this example is a user plane resource being migrated) to utilize its communication links to the receiving MGCF for payload processing. The process of handing off a MGW is repeated for each MGW in the initial subset until all of the MGWs in this group are migrated.

In some examples, the control plane resources have a load sharing redundancy scheme where a minimum of two active links are utilized. Accordingly, at step 414, the current owner processing unit instructs an initial subset of the control plane resources served by the processing unit to utilize their communication link(s) to the receiving processing unit(s) for payload processing. In some examples, the control plane resources can utilize their communication link(s) to the receiving processing unit(s) for payload processing at the beginning of the migration. In other examples, the control plane resources can delay utilizing their communication links to the receiving processing unit(s) for payload processing until a later stage of the migration process. Regardless of the choice, the MP communications technique in this present disclosure forwards an incoming service event to the processing unit that is performing payload processing for the associated resource(s) when a service event initially arrives on the wrong processing unit from the control plane resource. The timing and strategy can be chosen based on factors such as signaling links bandwidth, processing throughput optimization, and minimal setup delay to end-users.

In the example of a MGCF, one of the Signaling Relays out of each SR pair connected to RNCs and/or MMEs is instructed to utilize its communication link to the receiving MGCF for payload processing. This migration of the SR may be transparent to RNCs and/or MMEs connected to the SR. Instructing one SR of each pair still communicating with the current owner MGCF to utilize their communication link(s) to the receiving MGCF(s) for payload processing may be performed using a mechanism similar to the H.248 Handoff procedure.

Figure 9:
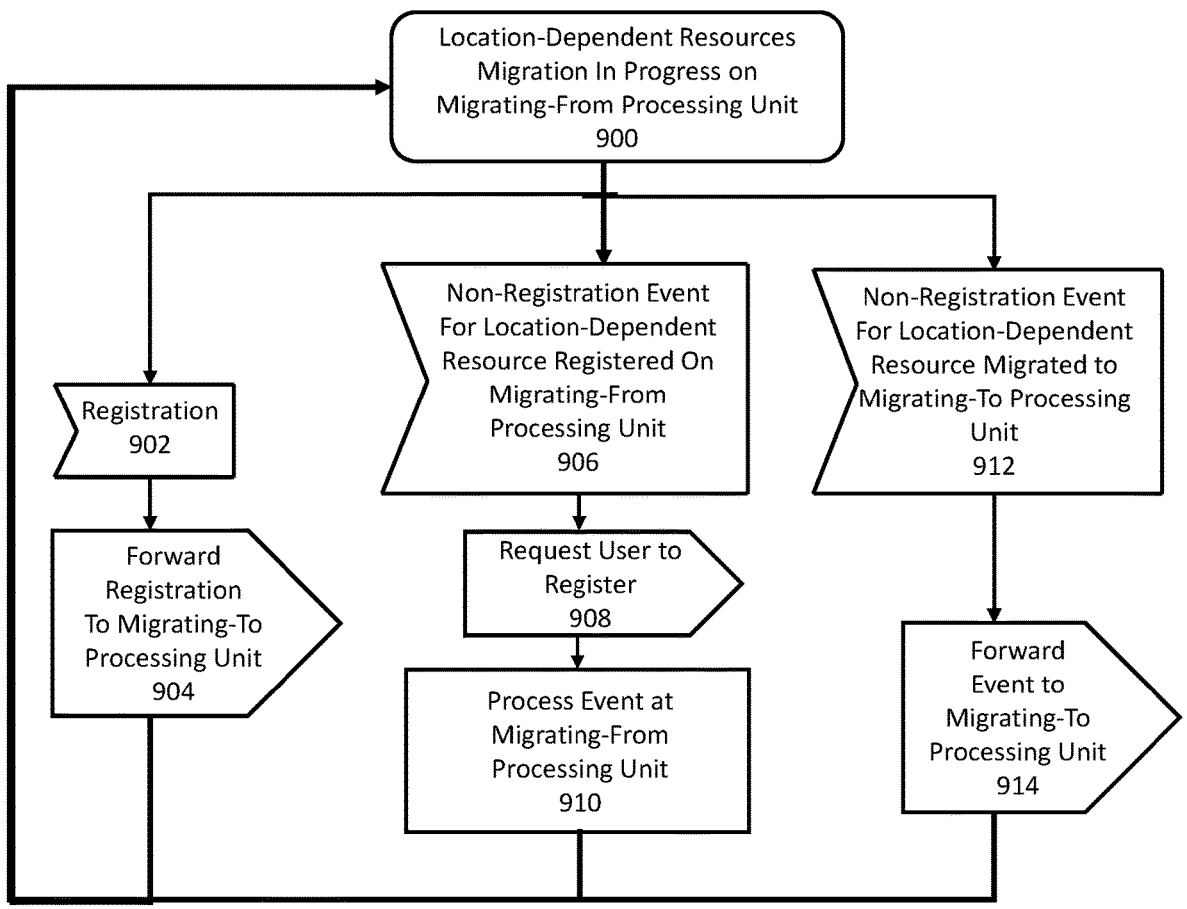
FIGS. 9 and 10 are flowcharts illustrating a processing unit using logic that is also demonstrated in FIG. 7 to process messages during a migration, according to some examples of the present disclosure.
Figure 10:
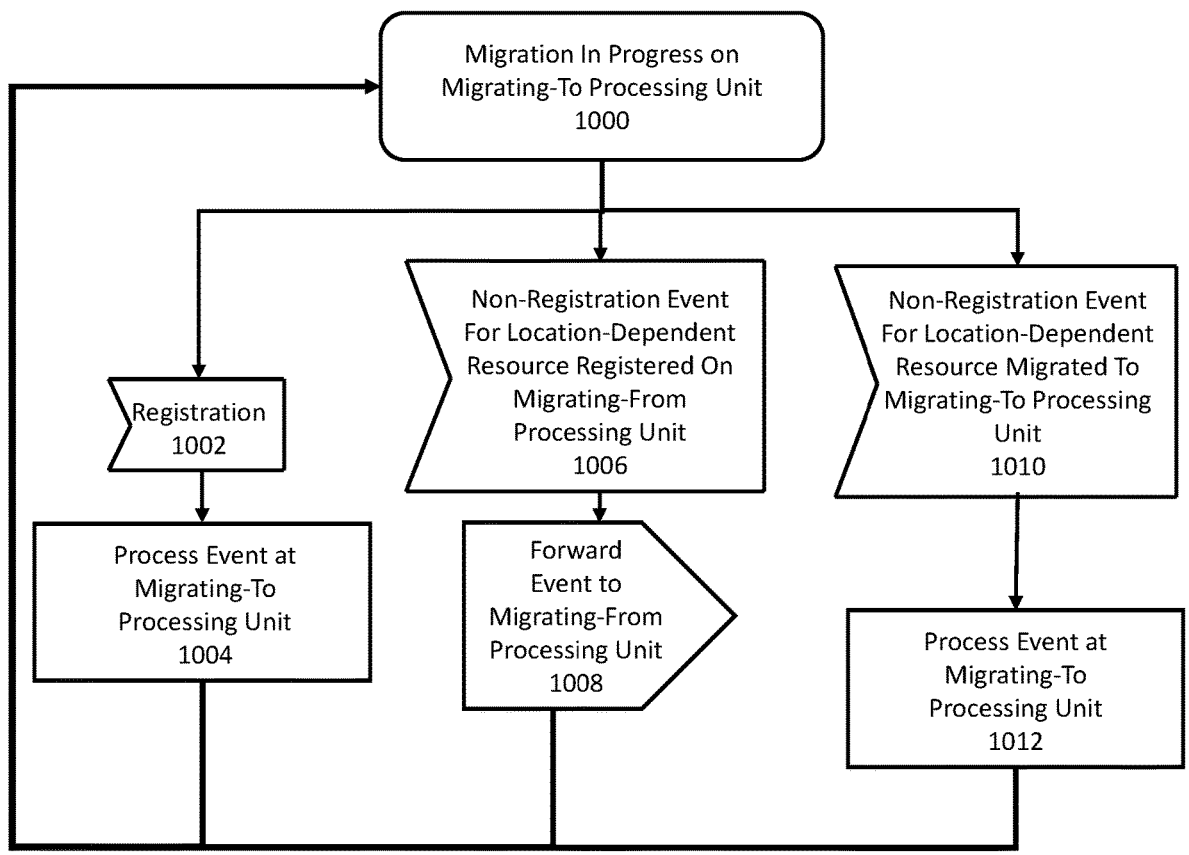

In some examples at step 500, the current owner processing unit and the receiving processing unit(s) may also work together to relocate associated location-dependent resources from the current owner processing unit to the one or more receiving processing unit(s). During the migration, messages may be forwarded between the processing units to the processing unit where the location-dependent resources reside as shown in FIGS. 9 and 10. In the example of a MGCF, the location-dependent resources are the registration and the data of the 3G and/or SGs subscribers in the active serving VLR (Visitor Location Register) of the current owner MGCF.

In some examples during the migration of location-dependent resources, the current owner processing unit may instruct a subset of resources (or their relay functions) served by the current owner processing unit to utilize their communication link(s) to the receiving processing unit(s) in a manner that is proportional to the location-dependent resource migration and traffic pattern to guarantee no service degradation on both the current owner processing unit and receiving processing unit(s). At step 502, a trigger is detected to check the migration progress of the location-dependent resources. Some examples of a trigger include the migration of a number or percentage of location-dependent resources, a migration progress timer expiration, or a migration success notification from a receiving processing unit.

Once a trigger is detected, a subset of user plane resources may be chosen (at step 504) when more user plane resources are migrated to a receiving processing unit or resume payload processing with the current owner processing unit in order to align with the migration rate of the interdependent resources. The deloading of these user plane resources may be started or stopped depending on whether the user plane resource is being migrated or if it is to remain in place. At step 508, one of the user plane resources completes the deloading. At step 510, the user plane resource is instructed to utilize its communication link(s) to the receiving processing unit for payload processing. In the example of a MGCF, the MGWs are the user plane resources to be handed off in proportion to the number of subscribers, the traffic pattern, and a predicted amount of resources needed on the receiving MGCF(s) and the current owner MGCF.

For example, a current owner MGCF selects a subset of MGWs served by the current owner MGCF for migration to the receiving MGCF in a manner that is proportional to the subscriber migration, traffic pattern, and resources needed. The proportional migration is done so that the receiving MGCF has just the right amount of resources to serve the traffic as it is migrated, and the current owner MGCF continues to serve traffic with no service degradation. The current owner MGCF deloads these MGWs by not selecting them for any new calls. Once all existing calls are complete on a MGW, the current owner MGCF uses the H.248 Handoff procedure to instruct this MGW to utilize its communication link(s) to the receiving MGCF for payload processing.

In some examples as the subset of user plane resources are being deloaded and location-dependent resources are being migrated, a subset of control plane resources are instructed to utilize their communication link(s) to the receiving processing unit(s) (at step 512) in a manner that is proportional to the user plane and/or location-dependent resource migration and traffic pattern to guarantee no service degradation on both the current owner processing unit and receiving processing unit(s).

In order to ensure proportional migration of interdependent resources, the migration of one type of resource may be delayed or accelerated in order to allow the migration of other types of resources to align properly. For example during the migration, at step 506, the migration of location-dependent resources may be temporarily stopped and restarted to ensure that the location-dependent resource migration remains in proportion to the migration of other resources. The order of steps 504, 506, and 512 may vary depending on the implementation and resource dependency. At step 514, a decision is made whether the desired level of location-dependent resources has been achieved. Until the level has been achieved, the user plane, control plane, and location-dependent resource migration may continually be adjusted.

The current owner processing unit and receiving processing unit(s) (such as one or more receiving MGCFs) may work together to relocate subscribers corresponding to the migrated resources from the current owner MGCF to the receiving MGCF(s) in a manner that does not have any service impact. In some MGCF examples, message processing for subscriber migration is described in more detail with respect to FIGS. 9 and 10. The subscriber migration mechanism to guide subscribers to register with the receiving MGCF may be temporarily stopped (at step 506) to slow down the new incoming registrations to the receiving MGCF in order to allow other resource migrations to catch up. Once the other resource migrations catch up, the subscriber migration mechanism may be restarted. Also other resource migrations may be delayed or accelerated such that the other resource migration rate aligns with the subscriber migration rate.

In some examples, once the level of location-dependent resource migration is achieved at step 600, the current owner processing unit instructs a subset of the control plane resources served by the current owner processing unit to utilize their communication link(s) to the receiving processing unit(s) for payload processing (at step 602). Depending on the scenario, there may not be a need to move any additional control plane resources.

Once the 3G and/or SGs subscriber migration is complete in the example of a full migration of MGCF traffic, the current owner MGCF uses a mechanism similar to the H.248 Handoff procedure to instruct the second SR out of each SR pair within the current owner MGCF to utilize their communication link(s) to the receiving MGCF(s) for payload processing.

After migrating the last subset of selected control plane resources, the current owner processing unit may migrate a last subset of selected user plane resources. Depending on the scenario, there may not be a need to move any additional user plane resources. At step 604, if user plane resources are to be migrated, this subset is chosen and the deloading of this subset is started. Step 606 is the state where this subset is deloading. At step 608, one of the user plane resources completes the deloading or proceeds to step 614 as needed. At step 610, the user plane resource (or its relay function) served by the current owner processing unit is instructed to utilize its communication link(s) to the receiving processing unit for payload processing. Once all selected resources in the last subset are determined to have been migrated, at step 612, the migration is complete at step 614.

In the example of a MGCF, the current owner MGCF deloads the last subset of selected MGWs by not selecting them for any new calls. Once all existing calls are complete on a MGW in the last subset, the current owner MGCF uses the H.248 Handoff procedure to instruct this MGW to utilize its communication link(s) to the receiving MGCF for payload processing. This sequence is repeated until all MGWs in the last selected subset are migrated to the receiving MGCF(s).

After all MGWs serving SIP and SIP-I traffic are migrated from the current owner MGCF to the receiving MGCF in the case of a complete traffic migration, the current owner MGCF may use the existing mechanism of responding to an incoming initial INVITE with a 503 Service Unavailable response containing a Retry-After header which causes the neighboring node to reroute if the current owner MGCF is not completely taken out of service (for example, to perform a software upgrade).

In some examples, the stages of resource migration may vary depending on factors such as the migration rate of the location-dependent resources. The above sequence of providing multiple migration stages offers the advantage of minimizing messaging among the processing units. For example in a MGCF, the subscribers will not perform Location Update to the receiving MGCF simultaneously, so the MGWs and SRs should migrate in stages proportional to the migrate rate of the subscribers. Otherwise more messages would require forwarding to MGCF where the subscriber resides.

The migration order of the user plane and control plane resources may vary depending on the scenario. The user plane resources may be migrated first in some scenarios while the control plane resources may be migrated first in other scenarios. In other examples, the user plane resources and control plane resources are migrated at the same time. The migration order may be based on the type of interdependency among resources. For example, the control plane often has a dependency on the availability of user plane resources, and location-dependent resources often have a dependency on the control plane resources and/or user plane resources. Accordingly, the migration protocol is used to find the resources that are dependent upon one another, that may be scattered and/or distributed across the plurality of processing units, and to vary the order of the migration to take into account the locations of the dependent resources.

Figure 7:
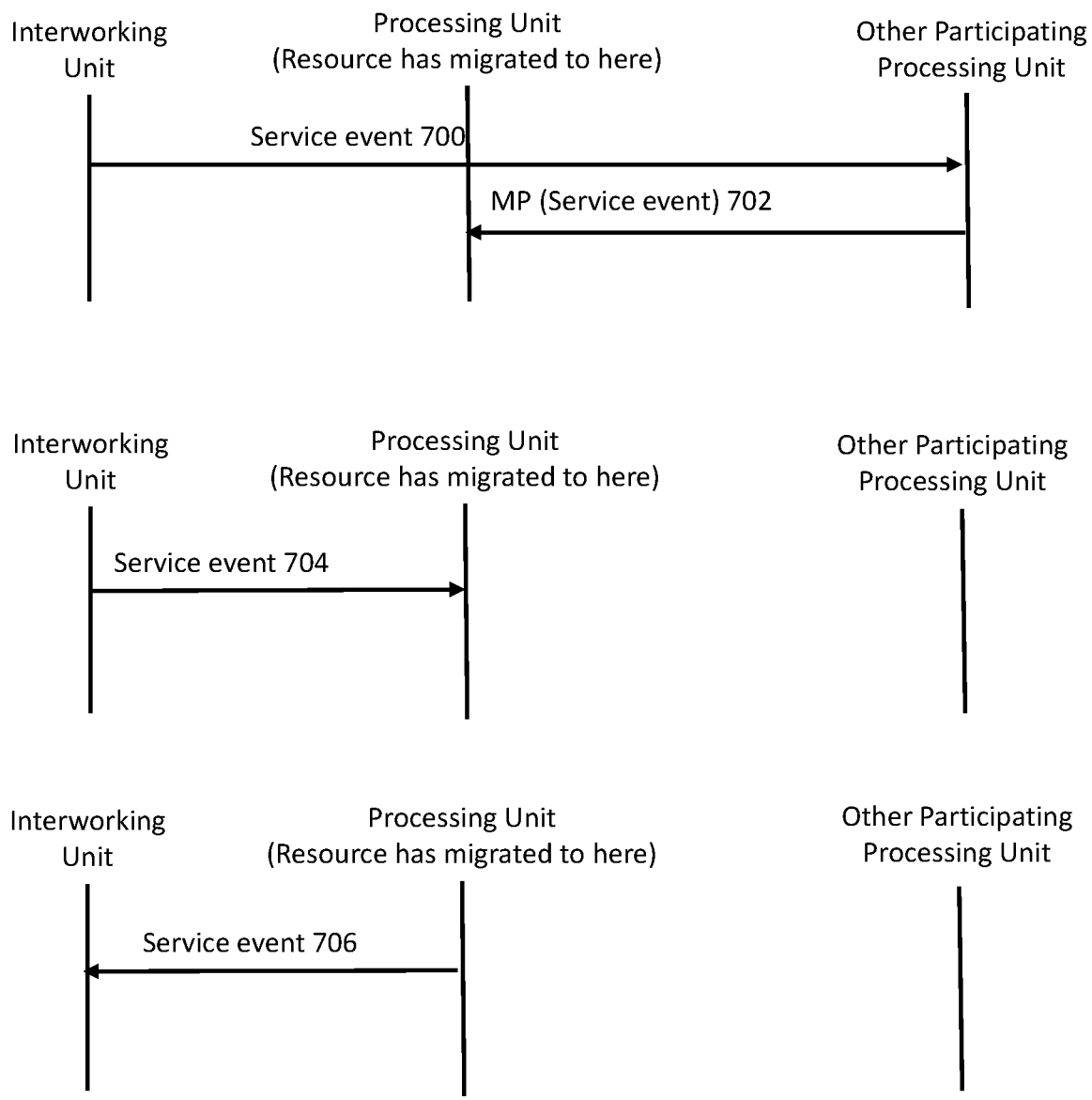
FIG. 7 provides an example message flow where the communication among the plurality of processing units is utilized to forward a service event to the processing unit that does payload processing for a selected resource, according to some examples of the present disclosure.

FIG. 7 provides an example where the communication among the plurality of processing units is utilized to forward a service event to the processing unit that is performing payload processing with the associated resource (step 702) if the event initially arrives on a processing unit that is not performing payload processing with the resource (step 700). If the event arrives on the processing unit that is performing payload processing with the associated resource (step 704), the event is not forwarded and can be processed locally. In some examples if the processing unit that is performing payload processing with the associated resource is to send an outgoing event, the outgoing event is sent directly to the interworking unit (step 706).

Figure 8:
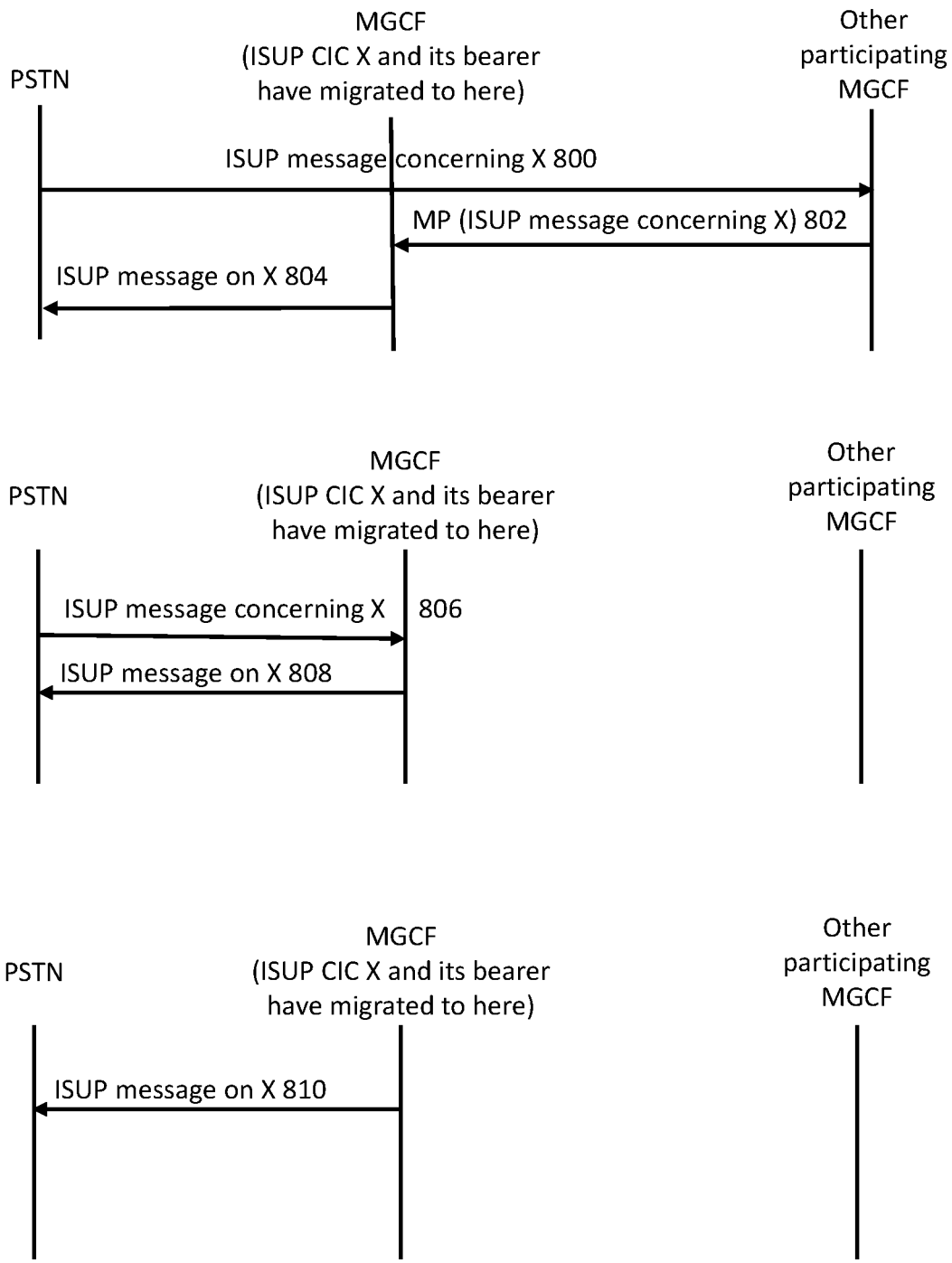
FIG. 8 shows example message flows where the communication between MGCFs is utilized to forward an Integrated Services Digital Network User Part (ISUP) message of a specific Circuit Identification Code (CIC) to a MGCF that owns the concerned CIC and associated media resource.

In some examples of a MGCF, all MGCFs in the plurality of processing units have connections to the Signaling Transfer Point (STP) which connects to the PSTN. FIG. 8 shows example message flows of a plurality of processing units connected to the PSTN. If an ISUP message arrives on a MGCF that is not performing payload processing for the associated MGW (step 800), the ISUP message is forwarded to the correct MGCF (step 802) using the MP. If an ISUP message arrives on a MGCF that is performing payload processing for the associated MGW (step 806), the message is processed locally. If the MGCF sends an outgoing ISUP message, the ISUP message is sent directly to the PSTN (steps 804, 808, and 810).

FIGS. 9 and 10 contain flowcharts illustrating a processing unit processing messages during a migration, according to some examples of the present disclosure. FIG. 9 shows examples of the processing from the perspective of the processing unit that is migrating location-dependent resources 900 (Migrating-From in the figure), and FIG. 10 shows examples of the processing from the perspective of the processing unit that is accepting location-dependent resources 1000 (Migrating-To in the figure).

At step 902, during the migration, any incoming user registration events received on the Migrating-From processing unit may be forwarded to the Migrating-To processing unit at step 904. Any incoming user registration events received on the Migrating-To processing unit (step 1002) may be processed locally at step 1004.

If, at step 906, an incoming non-registration event is received on the Migrating-From processing unit for a location-dependent resource that is registered on the Migrating-From processing unit, the Migrating-From processing unit may request and/or guide the location-dependent resource to register at step 908. At step 910, the event may be processed on the Migrating-From processing unit. If, at step 1006, an incoming non-registration event is received on the Migrating-To processing unit for a location-dependent resource that is registered on the Migrating-From processing unit, the Migrating-To processing unit forwards the event to the Migrating-From processing unit at step 1008. The Migrating-From processing unit may guide the location-dependent resource to re-register.

If, at step 912, an incoming non-registration event is received on the Migrating-From processing unit for a location-dependent resource that has already been migrated to the Migrating-To processing unit, the event may be forwarded from the Migrating-From processing unit to the Migrating-To processing unit at step 914. The event may be then processed on the Migrating-To processing unit. On the other hand, if an incoming non-registration event is received on the Migrating-To processing unit for a location-dependent resource that has already been migrated to the Migrating-To processing unit at step 1010, the event may be processed locally at step 1012.

The invention claimed is:

1. A method performed by one or more in-service Media Gateway Control Function (MGCF) processing units to migrate resources comprising one or more Mobility Management Entity (MME) Relays and Media Gateways (MGWs), the method comprising:
   communicating with at least one processing unit of a plurality of processing units, the communicating corresponding to a plurality of resources, and resource requirements of the plurality of processing units;
   evaluating resource utilization and projected traffic of a subset of the plurality of processing units;
   determining, based on the resource requirements, to migrate one or more selected interdependent resources for a service from one or more processing units to one or more receiving processing units of the plurality of processing units; and
   instructing the one or more selected interdependent resources to perform payload processing corresponding to one or more receiving processing units of the plurality of processing units, the payload processing causing the one or more migrated resources to provide the service to the one or more receiving processing units;
   wherein the method further comprises:
      determining that a resource cannot relocate to another processing unit;
      providing a relay between the resource and the plurality of processing units, wherein the relay forwards events between the resource and a processing unit that is performing payload processing for the resource; and
      migrating the relay to the one or more receiving processing units for payload processing.

2. The method of claim 1, further comprising:
   forwarding an incoming event concerning a resource to the processing unit, within the plurality of processing units, that performs payload processing with the resource.

3. The method of claim 1, wherein the communications include: health check information, migration permission information, migration status information, forwarded service events comprising one or more Integrated Services Digital Network User Part (ISUP) messages or subscriber-related messages, and security information.

4. The method of claim 1, wherein the determining to migrate one or more resources comprises one or more of: a user instruction; a request received from an owner of a resource to be migrated or a request sent to an owner of a resource to be migrated.

5. The method of claim 1, further comprising:
   identifying, based on the evaluation, that a neighboring processing unit has received a burst of traffic; and
   responsive to the identifying, readying resources for a higher inflow of traffic.

6. The method of claim 1, wherein the selected resources that operate interdependently include one or more control plane resources and user plane resources,
   wherein the selected resources offer an Integrated Services Digital Network User Part (ISUP) call processing service,
   wherein the control plane resources comprise ISUP CIC resources with PSTN signaling connectivity,
   wherein the user plane resources comprise one or more MGWs providing ISUP bearer connections, and
   wherein each of the ISUP CICs is assigned a bearer timeslot of the ISUP bearer connections.

7. The method of claim 1, wherein the selected resources that operate interdependently include one or more control plane resources that associate with location-dependent resources,
   wherein the selected resources offer Short Message Service (SMS),
   wherein the one or more control plane resources include signaling resources for transporting SMS messages, and
   wherein the location-dependent resources include subscriber data corresponding to registered mobile devices that communicate the SMS messages.

8. The method of claim 1, wherein the selected resources that operate interdependently include one or more user plane resources and control plane resources that associate with location-dependent resources,
   wherein the selected resources offer a mobile narrowband or wideband Adaptive Multi-Rate (AMR) call service,
   wherein the user plane resources comprise one or more MGWs providing narrowband or wideband AMR codec functionality accordingly,
   wherein the control plane resources comprise signaling connectivity with one or more RNCs to which registered mobile devices are tuned, and
   wherein the location-dependent resources include subscriber data corresponding to registered mobile devices.

9. The method of claim 1, wherein selected resources operate interdependently to setup a service, and
   wherein the service comprises a Voice over Long-Term Evolution (VoLTE) interworking with Public Switched Telephone Network (PSTN) call service using an MGCF, the resources include a MGW providing an H.248 ephemeral termination for a bearer corresponding to a Session Initiation Protocol (SIP) session, an Internet Protocol Multimedia Subsystem (IMS) far end connected over a SIP signaling connection, a MGW providing an H.248 physical termination for an Integrated Services Digital Network User Part (ISUP) bearer, and an associated ISUP Circuit Identification Code (CIC) with PSTN signaling connectivity.

10. The method of claim 1, wherein the determining includes one or more of the following:
   determining an amount of user plane resources to migrate corresponding to the projected traffic;
   determining an amount of control plane resources to migrate corresponding to the projected traffic;
   determining an amount of location-dependent resources to migrate corresponding to the projected traffic; or
   determining that at least a minimum threshold of service will be provided during and after the migration.

11. The method of claim 1, further comprising:
   deloading the service from one or more user plane resources of the selected resources, the deloading including selecting other user plane resources that are not being deloaded to handle a new incoming service request; and migrating the one or more user plane resources, the migrating including after determining that the service is not currently handling any requests on each user plane resource, instructing that user plane resource to re-assign one or more communication links to the one or more receiving processing units.

12. The method of claim 1, further comprising one or more of:

adjusting an amount of interdependent resources based on the projected traffic throughout a migration; or adjusting a migration rate of the selected interdependent resources in one or more of the following ways throughout a migration:

temporarily stopping and restarting migration of one or more location-dependent resources;

migrating one or more additional user plane resources or temporarily stopping deloading of one or more user plane resources; or migrating one or more additional control plane resources or temporarily stopping migration of one or more control plane resources.

13. A non-transitory computer-readable storage medium having stored thereon instructions executable by processing circuitry to perform operations comprising:

communicating with at least one processing unit of a plurality of processing units, the communicating corresponding to a plurality of resources, and resource requirements of the plurality of processing units;

evaluating resource utilization and projected traffic of a subset of the plurality of processing units;

determining, based on the resource requirements, to migrate one or more selected interdependent resources for a service from one or more processing units to one or more receiving processing units of the plurality of processing units; and instructing the one or more selected interdependent resources to perform payload processing corresponding to one or more receiving processing units of the plurality of processing units, the payload processing causing the one or more migrated resources to provide the service to the one or more receiving processing units;

wherein the operations further comprise:

deloading the service from one or more user plane resources of the selected resources, the deloading including selecting other user plane resources that are not being deloaded to handle a new incoming service request; and migrating the one or more user plane resources, the migrating including after determining that the service is not currently handling any requests on each user plane resource, instructing that user plane resource to re-assign one or more communication links to the one or more receiving processing units.

14. The non-transitory computer-readable storage medium of claim 13, wherein the selected resources that operate interdependently to provide a service include one or more of the following:

one or more control plane resources and user plane resources, wherein for an Integrated Services Digital Network User Part (ISUP) call processing service, the control plane resources comprise ISUP Circuit Identification Code (CIC) resources with PSTN signaling connectivity, the user plane resources comprise MGWs providing ISUP bearer connections, and each of the ISUP CICs is assigned a bearer timeslot of the ISUP bearer connections;

one or more control plane resources that associate with location-dependent resources, wherein for Short Message Service (SMS), the control plane resources include signaling resources for transporting SMS messages and the location-dependent resources include subscriber data corresponding to registered mobile devices that communicate the SMS messages;

one or more user plane resources that associate with one or more control plane resources, wherein for a G.711, a narrowband Adaptive Multi-Rate (AMR), or a wideband AMR call service, the user plane resources provide G.711, narrowband AMR, or wideband AMR codec functionality accordingly, and the control plane resources comprise signaling connectivity with an interworking node; or selected resources to setup a service, wherein for a Voice over Long-Term Evolution (VoLTE) interworking with Public Switched Telephone Network (PSTN) voice call in a Media Gateway Control Function (MGCF), the resources that operate interdependently include a MGW providing an H.248 ephemeral termination for a bearer corresponding to a Session Initiation Protocol (SIP) session, an Internet Protocol Multimedia Subsystem (IMS) far end connected over a SIP signaling connection, a MGW providing an H.248 physical termination for an Integrated Services Digital Network User Part (ISUP) bearer, and an associated ISUP Circuit Identification Code (CIC) with PSTN signaling connectivity.

15. The non-transitory computer-readable storage medium of claim 13, the operations further comprising:

adjusting an amount of interdependent resources based on the projected traffic throughout a migration; or adjusting a migration rate of the selected interdependent resources in one or more of the following ways throughout a migration:

temporarily stopping and restarting migration of one or more location-dependent resources;

migrating one or more additional user plane resources or temporarily stopping deloading of one or more user plane resources; or migrating one or more additional control plane resources or temporarily stopping migration of one or more control plane resources.

16. A system comprising:

a non-transitory memory; and one or more hardware processors coupled to the non-transitory memory and configured to read instructions from the non-transitory memory to cause the system to perform operations comprising:

communicating with at least one processing unit of a plurality of processing units, the communicating corresponding to a plurality of resources, and resource requirements of the plurality of processing units;

evaluating resource utilization and projected traffic of a subset of the plurality of processing units;

determining, based on the resource requirements, to migrate one or more selected interdependent resources for a service from one or more processing units to one or more receiving processing units of the plurality of processing units; and instructing the one or more selected interdependent resources to perform payload processing corresponding to one or more receiving processing units of the plurality of processing units, the payload processing causing the one or more migrated resources to provide the service to the one or more receiving processing units;

wherein the operations further comprise at least one of:
adjusting an amount of interdependent resources based on the projected traffic throughout a migration; or
adjusting a migration rate of the selected interdependent resources in one or more of the following ways throughout a migration:
temporarily stopping and restarting migration of one or more location-dependent resources;
migrating one or more additional user plane resources or temporarily stopping deloading of one or more user plane resources; or
migrating one or more additional control plane resources or temporarily stopping migration of one or more control plane resources.

17. The system of claim 16, wherein the selected resources that operate interdependently to provide a service include one or more of the following:

one or more control plane resources and user plane resources, wherein for an Integrated Services Digital Network User Part (ISUP) call processing service, the control plane resources comprise ISUP Circuit Identification Code (CIC) resources with PSTN signaling connectivity, the user plane resources comprise MGWs providing ISUP bearer connections, and each of the ISUP CICs is assigned a bearer timeslot of the ISUP bearer connections;

one or more control plane resources that associate with location-dependent resources, wherein for Short Message Service (SMS), the control plane resources include signaling resources for transporting SMS messages and the location-dependent resources include subscriber data corresponding to registered mobile devices that communicate the SMS messages;

one or more user plane resources that associate with one or more control plane resources, wherein for a G.711, a narrowband Adaptive Multi-Rate (AMR), or a wideband AMR call service, the user plane resources provide G.711, narrowband AMR, or wideband AMR codec functionality accordingly, and the control plane resources comprise signaling connectivity with an interworking node; or selected resources to setup a service, wherein for a Voice over Long-Term Evolution (VoLTE) interworking with Public Switched Telephone Network (PSTN) voice call in a Media Gateway Control Function (MGCF), the resources that operate interdependently include a MGW providing an H.248 ephemeral termination for a bearer corresponding to a Session Initiation Protocol (SIP) session, an Internet Protocol Multimedia Subsystem (IMS) far end connected over a SIP signaling connection, a MGW providing an H.248 physical termination for an Integrated Services Digital Network User Part (ISUP) bearer, and an associated ISUP Circuit Identification Code (CIC) with PSTN signaling connectivity.

* * * * *